United States Patent [19]

Maeda

[11] 4,184,385

[45] Jan. 22, 1980

[54] OUTPUT SPLIT-TYPE MECHANICAL AND HYDRAULIC TRANSMISSION

[75] Inventor: Hiroaki Maeda, Toyota, Japan

[73] Assignee: Aisin Seiki Kabushiki Kaisha, Kariya, Japan

[21] Appl. No.: 814,718

[22] Filed: Jul. 11, 1977

[30] Foreign Application Priority Data

Jul. 14, 1976 [JP] Japan .................................. 51-83756

[51] Int. Cl.$^2$ ........................................... F16H 47/04
[52] U.S. Cl. .................................................... 74/687
[58] Field of Search ................ 74/687, 688, 689, 690, 74/691

[56] References Cited

U.S. PATENT DOCUMENTS

| 3,667,321 | 6/1972 | Maurice | 74/687 X |
| 3,714,845 | 2/1973 | Mooney, Jr. | 74/687 |
| 3,722,324 | 3/1973 | Cordner et al. | 74/687 |
| 3,783,711 | 1/1974 | Orshansky, Jr. | 74/687 |
| 4,008,628 | 2/1977 | Orshansky, Jr. | 74/687 |

*Primary Examiner*—Lance Chandler
*Attorney, Agent, or Firm*—Finnegan, Henderson, Farabow & Garrett

[57] ABSTRACT

An output split-type mechanical and hydraulic transmission includes input and output shafts, first and second differential gear mechanisms for establishing different input-output speed ratios, at least two clutch mechanisms for selectively cooperating with components of the differential gear mechanisms and the input and output shafts to establish different input-output speed ratio ranges, and first and second hydraulic pump motors. The first pump motor has a variable hydraulic capacity and is mechanically and drivably connected to the input shaft for establishing variations in the hydraulic capacity. The second pump motor is mechanically connected to at least one component of both the first and second differential gear mechanisms for establishing rotational speeds of the components of the differential gear mechanisms during the different input-output speed ratio ranges in relationship to the variations of the first pump motor's hydraulic capacity. The first differential gear mechanism includes at least three elements, the first element being connected to the input shaft, the second element being connected to the output shaft, and the third element being connected to the second pump motor. The second differential gear mechanism includes at least three elements, the first element being connected to the input shaft, the second element being connected to the output shaft, and the third element being connected to the second pump motor. A clutch mechanism selectively cooperates with the elements of the first and second differential gear mechanisms to establish different input-output speed ratio ranges and includes a clutch for selectively connecting the second element of the second differential gear mechanism to the output shaft.

40 Claims, 11 Drawing Figures

OUTPUT SPLIT-TYPE MECHANICAL AND HYDRAULIC TRANSMISSION

BACKGROUND OF THE INVENTION

This invention relates to an output split-type mechanical and hydraulic power transmission.

More particularly, this invention relates to an output split-type mechanical and hydraulic power transmission having a plurality of input-output speed ratio ranges.

In a conventional output split-type mechanical and hydraulic transmission utilizing a single input-output speed ratio range, the required horsepower capacity for a hydraulic pump motor used in the transmission is large. Because of this, conventional transmissions of this type are severely limited in a practical sense, i.e., the transmission is extremely expensive to manufacture, is large in size, and has a low power efficiency.

To attain the wide variation of speed changes required in automotive vehicles, conventional power transmissions have used a plurality of input-output speed ratio ranges. However, even when output split-type mechanical and hydraulic transmissions have incorporated the use of a plurality of input-output speed ratio ranges, no completely satisfactory results have been achieved and numerous problems have been encountered in meeting the necessary conditions and requirements.

In an output split-type mechanical and hydraulic transmission utilizing a plurality of input-output speed ratio ranges, it is desirable that the required horsepower capacity for the hydraulic pump motor be maintained at approximately the same level as the maximum output of the prime mover. To accomplish this, a transmission with a speed ratio varying from 0 to 1.0 should be divided into first and second input-output speed ratio ranges. When a transmission of this type is divided into first and second input-output speed ratio ranges, it is desirable to employ a pair of hydraulic pump motors, each having a horsepower capacity equivalent to the other, and a reaction shaft attached to one of the hydraulic pump motors rotatably changing in relationship to variation in the hydraulic capacity of the other of the hydraulic pump motors from a positive to a negative maximum.

In a transmission employing a pair of hydraulic pump motors as described above, to achieve the speed ratio variations, conventional practice would be to provide a differential gear mechanism exclusively for the first speed range having a standard speed ratio obtained during the middle of the first speed range and a differential gear mechanism exclusively for the second speed range having a standard speed ratio obtained during the middle of the second speed range. In this conventional practice, the input shafts of both the differential gear mechanisms are directly connected to the input shaft of the transmission so that the reaction shafts of both the differential gear mechanisms are negatively rotated to each other at the borders of the two speed ranges. It therefore becomes necessary to connect an additional mechanism between the two differential gear mechanisms to smoothly change the transmission from one speed range to the other. This structural arrangement of the transmission is complicated, is large in size, and makes the rotational speeds of the components of the differential gear mechanisms high during the second speed range, a range which is most frequently used during operation of the transmission.

Another conventional arrangement of the differential gear mechanisms, as an alternative to the above, would be to provide the differential gear mechanism exclusively for the second speed range having a standard speed ratio enlarged and a speed reducing mechanism interposed between the input shaft of the transmission and the input shaft of this differential gear mechanism. However, even in this arrangement, the speed-reducing ratio of the speed-reducing mechanism is large and thus continues to create problems of durability and noise during the more frequently used second speed range.

Numerous problems remain and no completely satisfactory results previously have been achieved. it is necessary that an output split-type mechanical and hydraulic transmission not only employ a plurality of input-output speed ratio ranges but also be small in size and low in manufacturing cost, have maximum power efficiency, and allow a high degree of design flexibility to meet the input-output speed ratio range requirements.

Accordingly, it is a primary object of this invention to provide a new and improved output split-type mechanical and hydraulic transmission employing a plurality of input-output speed ratio ranges.

It is a further object of this invention to provide a new and improved output split-type mechanical and hydraulic transmission having a high degree of design flexibility for establishing the plurality of input-output speed ratio ranges in accordance with predetermined operational requirements.

Another object of this invention is to provide a new and improved transmission of the above-described type wherein each input-output speed ratio range is continuous to make possible a continuous variable drive ratio.

Another object of this invention is to provide a new and improved transmission of the above-described type which has clutch means for selectively connecting components of the differential gear mechanisms with the input and output shafts and the hydraulic pump motors for establishing the plurality of input-output speed ratio ranges, thus minimizing the transmission size, and the weight and manufacturing cost of the transmission.

Still another object of this invention is to provide a new and improved transmission of the above-described type wherein the components of the differential gear mechanisms have rotational speeds maintained within practical operational limitations thereof.

A further object of this invention is to provide a new and improved transmission of the above-described type which arranges the differential gear mechanisms and rotational shafts of the hydraulic pump motors coaxially or in parallel with the input and output shafts.

Finally, it is an object of this invention to provide a highly simplified output split-type mechanical and hydraulic transmission which is small in size and low in weight and manufacturing cost, while transmitting maximum and continuous drive power.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects and in accordance with the purpose of the invention, as embodied and broadly described herein, the output split-type mechanical and hydraulic transmission of this invention comprises: (1) an input shaft; (2) an output shaft; (3) first and second hydraulic pump motors hydraulically connected to each other, and at least the first pump motor having a variable hydraulic capacity and being mechanically connected to the input shaft; (4) a first differential gear mechanism including at least three elements, the first element being connected to the input shaft, the second element being connected to the output shaft, and the third element being connected to the second pump motor; (5) a second differential gear mechanism including at least three elements, the first element being connected to the input shaft, the second element being connected to the output shaft, and the third element being connected to the second pump motor; and (6) clutch means for selectively cooperating with the elements of the first and second differential gear mechanisms to establish different input-output speed ratio ranges, the clutch means including clutch means for selectively connecting the second element of the second differential gear mechanism to be output shaft.

It is preferred that the first differential gear mechanism of the output split-type mechanical and hydraulic transmission comprise a first planetary gear having a first sun gear connected to the second pump motor, a first ring gear connected to the input shaft, a first pinion meshed with the first ring and sun gears, and a first carrier rotatably supporting the first pinion and connected to the output shaft.

It is further preferred that the second differential gear mechanism of the output split-type mechanical and hydraulic transmission comprise a second planetary gear having a second sun gear connected to the input shaft, a second ring gear connected to the second pump motor, a second pinion meshed with the second ring and sun gears, and a second carrier rotatably supporting the second pinion and connected to the output shaft.

Finally, it is preferred that the output split-type mechanical and hydraulic transmission have the output shaft coaxially arranged with the input shaft, the first differential gear mechanism coaxially arranged with the input and output shafts, and the hydraulic pump motors including rotational shafts parallel to the input shaft.

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS OF THE INVENTION

Reference will now be made in detail to the present preferred embodiments of the invention, examples of which are illustrated in the accompanying drawings.

Figure 1:
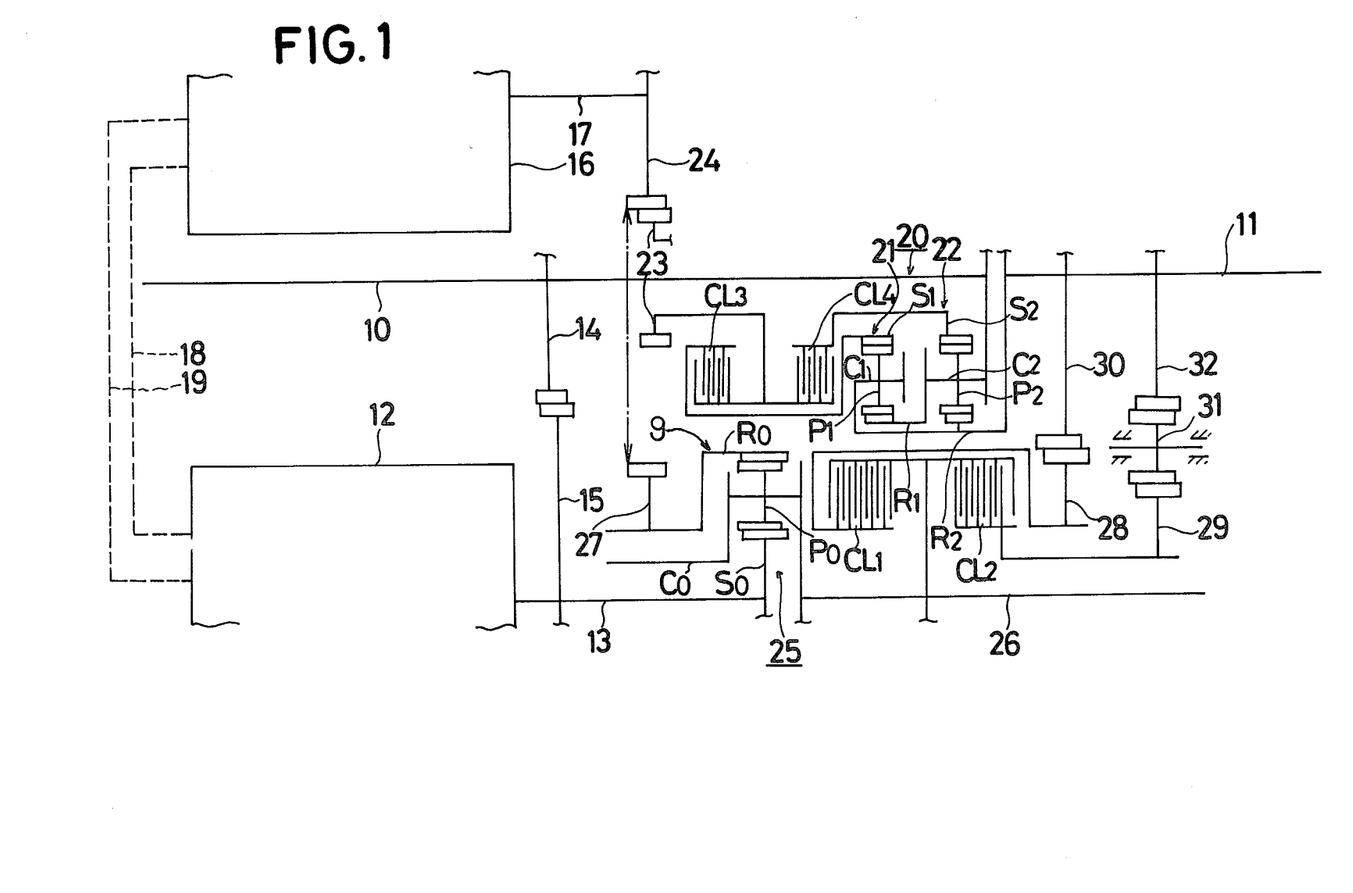
FIG. 1 is a schematic drawing of a first embodiment of the output split-type mechanical and hydraulic transmission employing the teachings of this invention.

Referring now to FIG. 1, there is shown a first preferred embodiment of an output split-type mechanical and hydraulic transmission employing the teachings of this invention. In accordance with the invention, the transmission includes an input shaft 10, and an output shaft 11. As herein embodied, the output shaft 11 is coaxially arranged with the input shaft 10.

In accordance with the invention, the transmission further comprises first and second hydraulic pump motors 12 and 16, respectively, which are hydraulically connected to each other. As herein embodied, the first and second pump motors 12 and 16 are hydraulically connected to each other by the conduits 18 and 19.

In accordance with the invention, at least the first pump motor 12 has a variable hydraulic capacity D1 and is mechanically connected to the input shaft 10. As herein embodied, the second pump motor 16 has a fixed hydraulic capacity D2. It is preferred that the first and second hydraulic pump motors 12 and 16 be axial piston-type motors wherein the hydraulic capacity D1 of the first pump motor 12 is variable from D1 MAX to −D1 MAX, D1 MAX being equivalent to −D1 MAX and to the hydraulic capacity D2 of the second pump motor 16.

As herein embodied and as shown in FIG. 1, the first and second hydraulic pump motors 12 and 16 have rotational shafts 13 and 17, respectively, parallel to the input shaft 10. Preferably, the rotational shaft 13 of the first pump motor 12 is mechanically connected to the input shaft 10 by a set of gears 15 and 14.

In accordance with the invention, the transmission further comprises a first differential gear mechanism 20. As herein embodied, the first differential gear mechanism 20 includes at least three elements, the first element being connected to the input shaft 10, the second element being connected to the output shaft 11, and the third element being connected to the second pump motor 16. Preferably, the first differential gear mechanism 20 is coaxially arranged with the input shaft 10 and output shaft 11.

As herein embodied and as shown in FIG. 1, the first differential gear mechanism 20 comprises first and third planetary gear units 21 and 22, respectively. Preferably, the first planetary gear unit 21 includes a sun gear S1, a ring gear R1, a pinion P1 meshed with the sun gear S1 and the ring gear R1, and a carrier C1 rotatably supporting the pinion P1. The third planetary gear 22 preferably includes a sun gear S2, a ring gear R2, a pinion P2 meshed with the sun gear S2 and the ring gear R2, and a carrier C2 rotatably supporting the pinion P2.

As herein embodied and as shown in FIG. 1, the ring gear R1 of the first planetary gear unit 21 and the carrier C2 of the third planetary gear unit 22 are integrally connected to each other and to the input shaft 10 and comprise the first element of the first differential gear mechanism 20.

As herein embodied, the carrier C1 of the first planetary gear unit 21 and the ring gear R2 of the third planetary gear unit 22 are integrally connected to each other and to the output shaft 11 and comprise the second element of the first differential gear mechanism 20.

As herein embodied, the sun gear S1 of the first planetary gear unit 21 is selectively and mechanically connected to the second hydraulic pump motor 16 and comprises the third element of the first differential gear mechanism 20. Preferably, the sun gear S1 is mechanically connected to the rotational shaft 17 of the second hydraulic pump motor 16 by a set of gears 24 and 23 as shown in FIG. 1.

As herein embodied, the first differential gear mechanism 20 further includes a fourth element connected to the second hydraulic pump motor 16. Preferably, the sun gear S2 of the third planetary gear unit 22 is selectively and mechanically connected to the second pump motor 16 and comprises the fourth element of the first differential gear mechanism 20. It is further preferred that the sun gear S2 be mechanically connected to the rotational shaft 17 of the second hydraulic pump motor 16 through a set of gears 23 and 24 as shown in FIG. 1.

In accordance with the invention, the transmission further comprises clutch means for selectively cooperating with elements of the differential gear mechanisms to establish different input-output speed ratio ranges. As herein embodied and as shown in FIG. 1, the clutch means includes a clutch CL3 for selectively engaging and disengaging the sun gear S1 (the third element) of the first differential gear mechanism 20 with the rotational shaft 17 of the second hydraulic pump motor 16 through the gears 23 and 24. Preferably, the clutch means further includes a clutch CL4 for selectively engaging and disengaging the sun gear S2 (the fourth element) of the first differential gear mechanism 20 with the rotational shaft 17 of the second hydraulic pump motor 16 through the gears 23 and 24.

In accordance with the invention, the transmission further comprises a second differential gear mechanism 25. As herein embodied, the second differential gear mechanism 25 includes at least three elements, the first element being connected to the input shaft 10, the second element being connected to the output shaft 11, and the third element being connected to the second hydraulic pump motor 16. Preferably, the second differential gear mechanism 25 is coaxially arranged with the rotational shaft 13 of the first hydraulic pump motor 12.

As herein embodied and as shown in FIG. 1, the second differential gear mechanism 25 comprises a second planetary gear unit 9. Preferably, the second planetary gear unit 9 includes a sun gear S0 mechanically connected to the input shaft 10, a ring gear R0 mechanically connected to the second pump motor 16, a pinion P0 meshed with the ring gear R0 and the sun gear S0, and a carrier C0 rotatably supporting the pinion P0 and connected to the output shaft 11.

As herein embodied, the transmission further includes an intermediate shaft 26 selectively and mechanically connected to the output shaft 11. Preferably, the intermediate shaft 26 is coaxially arranged with the rotational shaft 13 of the first hydraulic pump motor 12.

As herein embodied and as shown in FIG. 1, the sun gear S0 of the second planetary gear unit 9 is integrally connected to the rotational shaft 13 of the first hydraulic pump motor 12 and comprises the first element of the second differential gear mechanism 25.

As herein embodied and as shown in FIG. 1, the carrier C0 of the second planetary gear unit 9 is integrally connected to the intermediate shaft 26 and comprises the second element of the second differential gear mechanism 25.

As herein embodied and as shown in FIG. 1, the ring gear R0 of the second planetary gear unit 9 is mechanically connected to the rotational shaft 17 of the second hydraulic pump motor 16 through a set of gears 27 and 24 and comprises the third element of the second differential gear mechanism 25.

As previously mentioned, in accordance with the invention, the transmission comprises clutch means for selectively cooperating with elements of the differential gear mechanisms, to establish different input-output speed ratio ranges. In accordance with the invention, this clutch means includes clutch means for selectively connecting the second element of the second differential mechanism 25 to the output shaft 11.

As previously described, the carrier C0 of the second planetary gear unit 9 is integrally connected to the intermediate shaft 26 while the intermediate shaft 26 is selectively connected to the output shaft 11. As herein embodied and as shown in FIG. 1, the clutch means for selectively connecting the second element of the second differential gear mechanism 25 to the output shaft 11 includes a clutch CL1 for selectively connecting and disconnecting the intermediate shaft 26 with the output shaft 11. Preferably, the clutch CL1 selectively connects and disconnects the intermediate shaft 26 to the output shaft 11 through a set of gears 30 and 28. The gear 30 is integrally connected to the output shaft 11 and meshed with the gear 28 which is integrally connected to the clutch CL1.

As herein embodied and as shown in FIG. 1, the clutch means for selectively connecting the second element of the second differential gear mechanism 25 to the output shaft 11 includes another clutch CL2 for selectively connecting and disconnecting the intermediate shaft 26 to the output shaft 11. Preferably, the clutch CL2 selectively connects and disconnects the intermediate shaft 26 to the output shaft 11 through a set of gears 29, 31, and 32. Gear 31 is an idler gear meshed with gears 29 and 32, the gear 32 being integrally connected to the output shaft 11 and the gear 29 being integrally connected to the clutch CL2.

It is preferred that the clutches CL1, CL2, CL3, and CL4 be of a frictional type which is hydraulically actuated.

In the first embodiment of the transmission shown in FIG. 1, it is preferred that the ratios of the pitch circle diameter of the ring gear to sun gear of the first, second, and third planetary gears 21, 22 and 9, respectively, (R1/S1, R2/S2, R0/S0) be 2:1. It is further preferred that the ratios of the pitch circle diameter of the gear 15 to gear 14 and the gear 24 to gear 23 be 3:2, while the ratio of the pitch circle diameter of the gear 24 to gear 27 be 2:1. Preferably, the ratios of the pitch circle diameter of the gear 30 to gear 28 and the gear 32 to gear 29 be 4:3.

Figure 2:
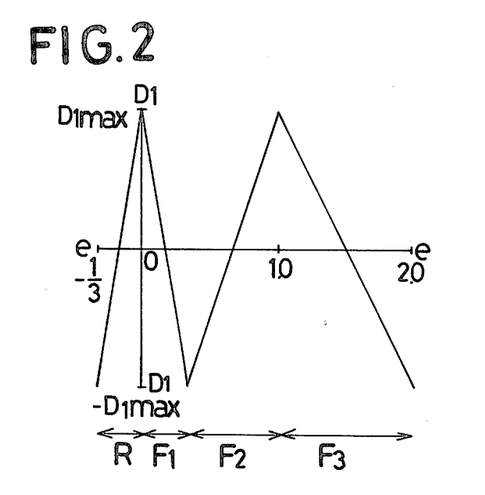
FIG. 2 is a graph illustrating the relationship between a hydraulic capacity D1 of the first hydraulic pump motor and an input-output speed ratio e for the embodiments of the transmission, in accordance with this invention, shown in FIGS. 1 and 5.
Figure 3:
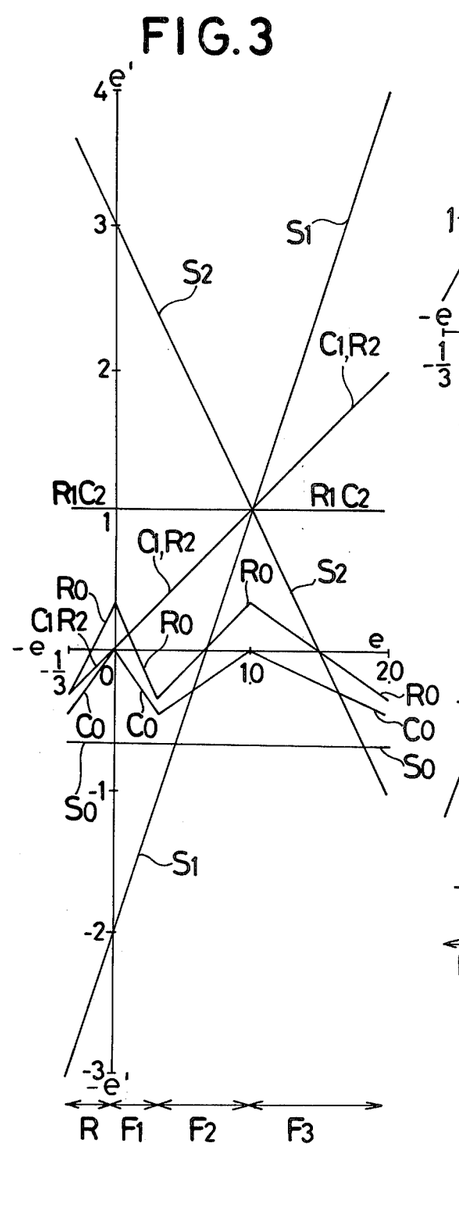
FIG. 3 is a graph illustrating the relationship between the rotational speed rato e′ of planetary gear components (ring gears, sun gears, and carriers) to the input shaft and the input-output speed ratio e for the embodiment of the transmission, in accordance with this invention, shown in FIG. 1.
Figure 4:
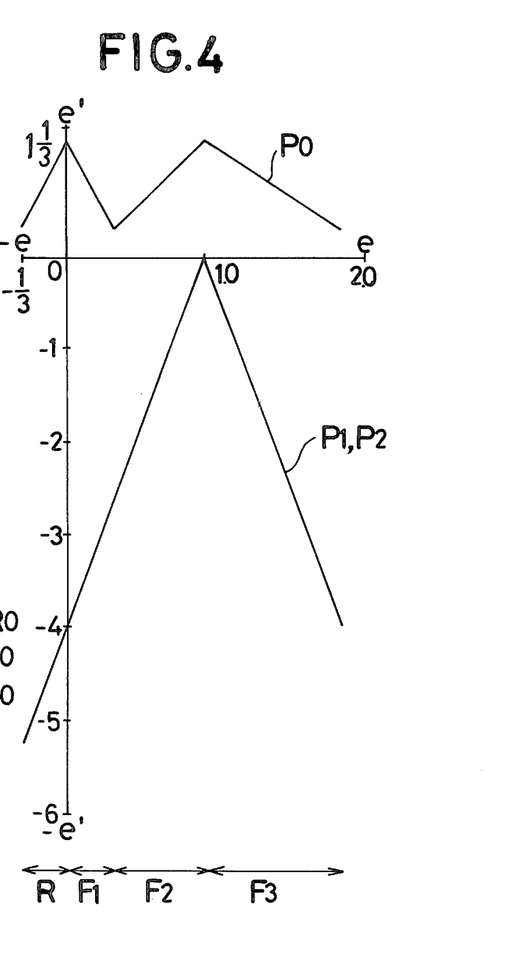
FIG. 4 is a graph illustrating the relationship between the rotational speed ratio e′ of planetary gear components (pinions) to the input shaft and the input-output speed ratio e for the embodiment of the transmission, in accordance with this invention, shown in FIG. 1.

Further reference is now made to FIGS. 2–4, to describe in detail the operation of the transmission as embodied and shown in FIG. 1.

To establish the first forward input-output speed ratio range F1, the clutch CL1 is engaged. At the initial establishment of the first forward speed range F1, the hydraulic capacity D1 of the first hydraulic pump motor 12 is set at D1 MAX, as best seen in FIG. 2. Therefore, because of the relationship in the hydraulic capacities of the first and second hydraulic pump motors 12 and 16, the shaft 17 of the second hydraulic pump motor 16 has the same rotational speed as the shaft 13 of the first hydraulic pump motor 12.

Since the ring gear R0 is mechanically connected with the rotational shaft 17 of the second pump motor 16 through gears 24 and 27 and since the rotational shaft 13 of the first hydraulic pump motor 12 is mechanically connected to the input shaft 10 through gears 15 and 14, the ring gear R0 has a rotational speed ratio e' to the input shaft 10 of $\frac{1}{3}$. In a similar fashion, since the sun gear S0 is integrally connected to the rotational shaft 13 of the first hydraulic pump motor 12 with the shaft 13 being mechanically connected to the input shaft 10 through gears 15 and 14, the sun gear S0 has a rotational speed ratio e' to the input shaft of $\frac{2}{3}$. Accordingly, the rotational speed of the carrier C0 is 0, the output shaft 11 is not rotated, and the input-output speed ratio e is 0.

The hydraulic capacity D1 of the first pump motor 12 in relationship to the input-output speed ratio e during the different speed ratios e' of the various components of the first and second differential gear mechanisms 20 and 25, respectively, to the input shaft 10 in relationship to the input-output speed ratio e are best illustrated in FIGS. 3 and 4.

When the hydraulic capacity D1 of the first pump motor 12 is continuously varied from D1 MAX to −D1 MAX during the first forward speed range F1, the rotational speed of the shaft 17 of the second hydraulic pump motor 16 is continuously increased. Since the rotational speed of the ring gear R0 is continuously decreased, the rotational speed of the carrier C0 is continuously decreased. Accordingly, the rotational speed of the output shaft 11 is continuously increased, thus continuously increasing the input-output speed ratio e.

As the hydraulic capacity D1 of the first hydraulic pump motor 12 is varied during the first forward speed range F1, the input-output speed ratio e can be continuously varied from 0 to $\frac{1}{3}$.

To further increase the input-output speed ratio e, the clutch CL3 is engaged and the clutch CL1 is disengaged. This selective engagement and disengagement of the clutches changes the transmission from the first forward speed range F1 to the second forward input-output speed ratio range F2. At the establishment of the second forward speed range F2, the rotational speed of the ring gear R2 and the carrier C1 are equivalent to the rotational speed of the output shaft 11. Accordingly, the rotational speed ratios e' of the ring gear R2 and the carrier C1 to the input shaft 10 are $\frac{1}{3}$. In a similar fashion, since the sun gear S1 is mechanically connected to the rotational shaft 17 of the second hydraulic pump motor 16 through gears 24 and 23, the rotational speed ratio e' of the sun gear S1 is −1.

When the hydraulic capacity D1 of the first hydraulic pump motor 12 is continuously varied from −D1 MAX to D1 MAX during the second forward speed range F2 as shown in FIG. 2, the input-output speed ratio e continuously increases. As the hydraulic capacity of the first hydraulic pump motor 12 is varied, the rotational speed of the shaft 17 of the second hydraulic pump motor 16 is continuously decreased. Since the rotational speed of the sun gear S1 is continuously increased, the rotational speed of the carrier C1 and the ring gear R2 are also increased. Accordingly, the rotational speed of the output shaft 11 is continuously increased, thus continuously increasing the input-output speed ratio e.

As the hydraulic capacity D1 of the first hydraulic pump motor 12 is varied during the second forward speed range F2, the input-output speed ratio e can be continuously varied from $\frac{1}{3}$ to 1.0.

To further increase the input-output speed ratio e, the clutch CL4 is engaged and the clutch CL3 is disengaged. This selective engagement and disengagement of the clutches changes the transmission from the second forward speed range F2 to the third forward input-output speed ratio range F3. At the establishment of the third forward speed range F3, the rotational speed of the sun gear S2 is initially synchronized with the rotational speed of the sun gear S1 because of the selective engagement of the clutch CL4 and disengagement of the clutch CL3. Since the ring gear R2 is integrally connected to the output shaft 11, the rotational speed of the ring gear R2 is equivalent to the rotational speed of the output shaft 11. Since the carrier C2 is integrally connected to the input shaft 10, the rotational speed of the carrier C2 is equivalent to the rotational speed of the input shaft 10.

When the hydraulic capacity D1 of the first hydraulic pump motor 12 is continuously varied from D1 MAX to −D1 MAX during the third forward speed range F3 as shown in FIG. 2, the input-output speed ratio e continuously increases. As the hydraulic capacity of the first hydraulic pump motor 12 is varied, the rotational speed of the shaft 17 of the second hydraulic pump motor 16 is continuously increased. Since the rotational speed of the gear S2 is continuously decreased, the rotational speeds of the ring gear R2 and the carrier C1 are continuously increased. Accordingly, the rotational speed of the output shaft 11 is continuously increased, thus continuously increasing the input-output speed ratio e. As the hydraulic capacity D1 of the first hydraulic pump motor 12 is varied during the third forward speed range F3, the input-output speed ratio e can be continuously varied from 1.0 to 2.0.

In a similar fashion, during the operation of the transmission when a change is made from the third forward speed range F3 to the first forward speed range F1, the input-output speed ratio e can be continuously varied from 2.0 to 0.

To change the transmission from first forward speed range F1 to a reverse input-output speed ratio range R, the clutch CL2 is engaged and the clutch CL1 is disengaged. At the establishment of the reverse speed range R, the rotational speed ratio e' of the ring gear R0 to the input shaft 10 is $\frac{1}{3}$ while the rotational speed ratio e' of the sun gear S0 to the input shaft 10 is $-\frac{2}{3}$.

When the hydraulic capacity D1 of the first hydraulic pump motor 12 is continuously varied from D1 MAX to −D1 MAX during the reverse speed range R as shown in FIG. 2, the input-output speed ratio e continuously decreases. As the hydraulic capacity of the first hydraulic pump motor 12 is varied, the rotational speed of the shaft 17 of the second hydraulic pump motor 16 is continuously increased. Since the rotational speed of the ring gear R0 is continuously decreased, the rotational speed of the carrier C0 is continuously decreased. Accordingly the rotational speed of the output shaft 11 is continuously decreased, thus continously decreasing the input-output speed ratio e.

As the hydraulic capacity D1 of the first hydraulic pump motor 12 is varied during the reverse speed range R, the input-output speed ratio can be continuously varied from 0 to $-\frac{1}{3}$. Accordingly, in this first embodiment of the transmission, the input-output speed ratio e can be continuously varied within a range of $-\frac{1}{3}$ to 2.0.

Figure 5:
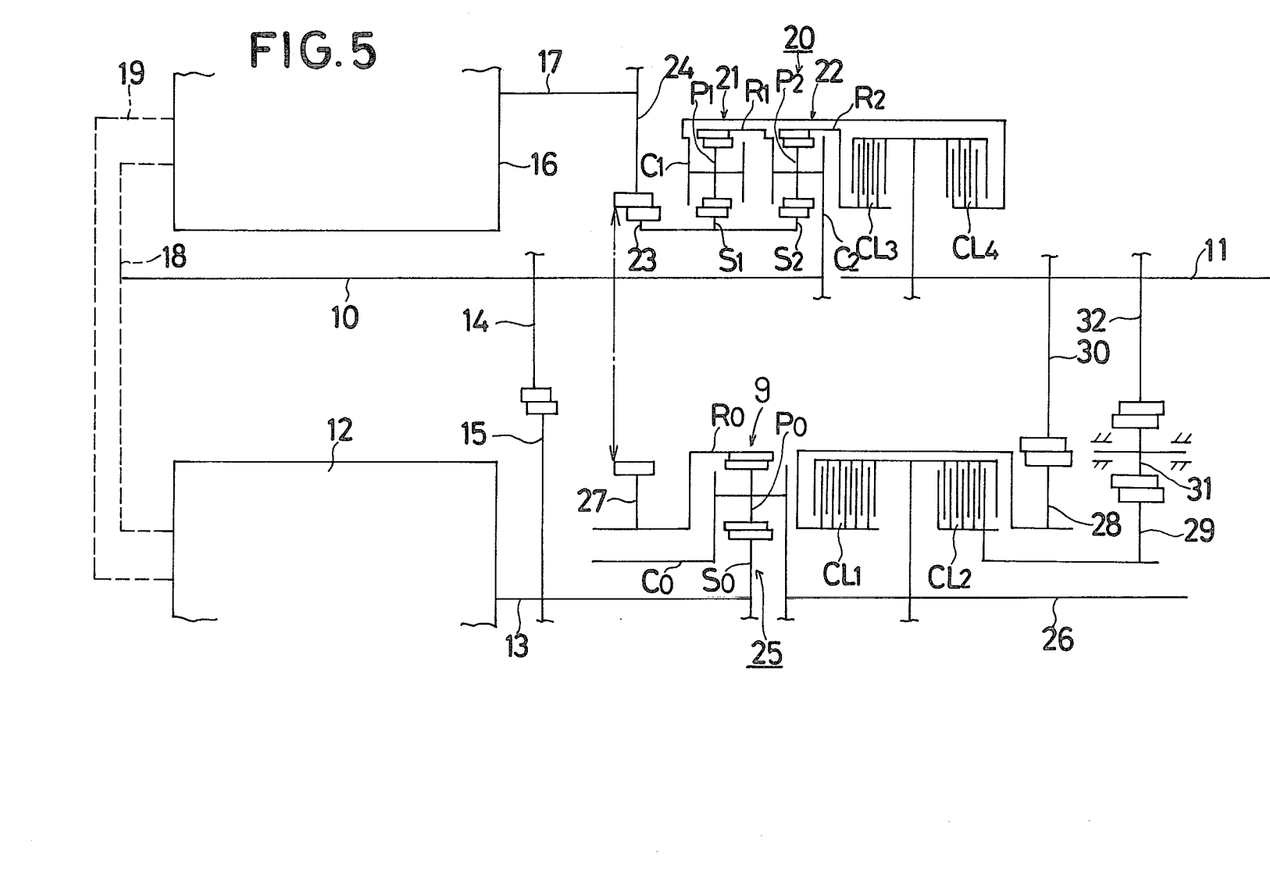
FIG. 5 is a schematic drawing of a second embodiment of the output split-type mechanical and hydraulic transmission employing the teachings of this invention.

Referring now to FIG. 5, there is shown a second preferred embodiment of an output split-type mechanical and hydraulic transmission employing the teachings of this invention. The same reference numerals are used to described similar elements for this second embodiment as those described and shown in the first preferred embodiment of FIG. 1. In accordance with the invention, the transmission includes an input shaft 10, and an output shaft 11. As herein embodied, the output shaft 11 is coaxially arranged with the input shaft 10.

In accordance with the invention, the transmission further comprises first and second hydraulic pump motors 12 and 16, respectively, which are hydraulically connected to each other. As herein embodied, the first and second pump motors 12 and 16 are hydraulically connected to each other by the conduits 18 and 19.

In accordance with the invention, at least the first pump motor 12 has a variable hydraulic capacity D1 and is mechanically connected to the input shaft 10. As herein embodied, the second pump motor 16 has a fixed hydraulic capacity D2. It is preferred that the first and second hydraulic pump motors 12 and 16 be axial piston-type pump motors wherein the hydraulic capacity D1 of the first pump motor 12 is variable from D1 MAX to −D1 MAX, D1 MAX being equivalent to −D1 MAX and to the hydraulic capacity D2 of the second pump motor 16.

As herein embodied and as shown in FIG. 5, the first and second hydraulic pump motors 12 and 16 have rotational shafts 13 and 17, respectively, parallel to the input shaft 10. Preferably, the rotational shaft 13 of the first pump motor 12 is mechanically connected to the input shaft 10 by a set of gears 15 and 14.

In accordance with the invention, the transmission further comprises a first differential gear mechanism 20.

As herein embodied, the first differential gear mechanism 20 includes at least three elements, the first element being connected to the input shaft 10, the second element being connected to the output shaft 11, and the third element being connected to the second pump motor 16. Preferably, the first differential gear mechanism 20 is coaxially arranged with the input shaft 10 and the output shaft 11.

As herein embodied and as shown in FIG. 5, the first differential gear mechanism 20 comprises first and third planetary gear units 21 and 22, respectively. Preferably, the first planetary gear unit 21 includes a sun gear S1, a ring gear R1, a pinion P1 meshed with the sun gear S1 and the ring gear R1, and a carrier C1 rotatably supporting the pinion P1. The third planetary gear unit 22 includes a sun gear S2, a ring gear R2, a pinion P2 meshed with the sun gear S2 and the ring gear R2, and a carrier C2 rotatably supporting the pinion P2.

As herein embodied and as shown in FIG. 5, the ring gear R1 of the first planetary gear unit 21 and the carrier C2 of the third planetary gear unit 22 are integrally connected to each other and to the input shaft 10 and comprise the first element of the first differential gear mechanism 20.

As herein embodied, the carrier C1 of the first planetary gear unit 21 is selectively connected to the output shaft 11 and comprises the second element of the first differential gear mechanism 20.

As herein embodied, the sun gear S1 of the first planetary gear unit 21 and the sun gear S2 of the third planetary gear unit 22 are integrally connected to each other and mechanically connected to the second pump motor 16 and comprise the third element of the first differential gear mechanism 20. Preferably, the sun gears S1 and S2 are mechanically connected to the rotational shaft 17 of the second hydraulic pump motor 16 through a set of gears 23 and 24 as shown in FIG. 5.

As herein embodied, the first differential gear mechanism 20 further includes a fourth element connected to the output shaft 11. Preferably and as shown in FIG. 5, the ring gear R2 of the third planetary gear unit 22 is selectively connected to the output shaft 11 and comprises the fourth element of the first differential gear mechanism 20.

In accordance with the invention, the transmission further comprises clutch means for selectively cooperating with the elements of the differential gear mechanisms to establish different input-output speed ratio ranges. As herein embodied and as shown in FIG. 5, this clutch means includes a clutch CL4 for selectively engaging and disengaging the carrier C1 (the second element) of the first differential gear mechanism 20 with the output shaft 11. Preferably, the clutch means further includes a clutch CL3 for selectively engaging and disengaging the ring gear R2 (the fourth element) of the first differential gear mechanism 20 with the output shaft 11.

In accordance with the invention, the transmission further comprises a second differential gear mechanism 25. As herein embodied, the second differential gear mechanism 25 includes at least three elements, the first element being connected to the input shaft 10, the second element being connected to the output shaft 11, and the third element being connected to the second hydraulic pump motor 16. Preferably, the second differential gear mechanism 25 is coaxially arranged with the rotational shaft 13 of the first hydraulic pump motor 12.

As herein embodied and as shown in FIG. 5, the second differential gear mechanism 25 comprises a second planetary gear unit 9. Preferably, the second planetary gear unit 9 includes a sun gear S0 mechanically connected to the input shaft 10, a ring gear R0 mechanically connected to the second pump motor 16, a pinion P0 meshed with the ring gear R0 and the sun gear S0, and a carrier C0 rotatably supporting the pinion P0 and connected to the output shaft 11.

As herein embodied, the transmission further includes an intermediate shaft 26 selectively and mechanically connected to the output shaft 11. Preferably the intermediate shaft 26 is coaxially arranged with the rotational shaft 13 of the first hydraulic pump motor 12.

As herein embodied and as shown in FIG. 5, the sun gear S0 of the second planetary gear unit 9 is integrally connected to the rotational shaft 13 of the first hydraulic pump motor 12 and comprises the first element of the second differential gear mechanism 25.

As herein embodied and as shown in FIG. 5, the carrier C0 of the second planetary gear unit 9 is integrally connected to the intermediate shaft 26 and comprises the second element of the second differential gear mechanism 25.

As herein embodied and as shown in FIG. 5, the ring gear R0 of the second planetary gear unit 9 is mechanically connected to the rotational shaft 17 of the second hydraulic pump motor 16 through a set of gears 27 and 24 and comprises the third element of the second differential gear mechanism 25.

As previously mentioned, in accordance with the invention, the transmission comprises clutch means for selectively cooperating with the elements of the differential gear mechanisms to establish different input-output speed ratio ranges. In accordance with the invention, this clutch means includes clutch means for selectively connecting the second element of the second differential gear mechanism 25 to the output shaft 11.

As previously described, the carrier C0 of the second planetary gear unit 9 is integrally connected to the intermediate shaft 26, while the intermediate shaft 26 is selectively connected to the output shaft 11. As herein embodied and as shown in FIG. 5, the clutch means for selectively connecting the second element of the second differential gear mechanism 25 to the output shaft 11 includes a clutch CL1 for selectively connecting and disconnecting the intermediate shaft 26 with the output shaft 11. Preferably, the clutch CL1 selectively connects and disconnects the intermediate shaft 26 to the output shaft 11 through a set of gears 30 and 28. The gear 30 is integrally connected to the output shaft 11 and meshed with the gear 28 which is integrally connected to the clutch CL1.

As herein embodied and as shown in FIG. 5, the clutch means for selectively connecting the second element of the second differential gear mechanism 25 to the output shaft 11 includes another clutch CL2 for selectively connecting and disconnecting the intermediate shaft 26 to the output shaft 11. Preferably, the clutch CL2 selectively connects and disconnects the intermediate shaft 26 to the output shaft 11 through a set of gears 29, 31 and 32. Gear 31 is an idler gear meshed with gears 29 and 32, the gear 32 being integrally connected to the output shaft 11 and the gear 29 being integrally connected to the clutch CL2.

It is preferred that the clutches CL1, CL2, CL3, and CL4 be of a frictional type which is hydraulically actuated.

In the second preferred embodiment of the transmission shown in FIG. 5, it is preferred that the ratios of the pitch circle diameter of the ring gear to sun gear of the first, second, and third planetary gears 21, 22 and 9, respectively, (R1/S1, R2/S2, R0/S0) be 2:1. It is further preferred that the ratios of the pitch circle diameter of the gear 15 to gear 14 and the gear 24 to gear 23 be 3:2, while the ratio of the pitch circle diameter of the gear 24 to gear 27 be 2:1. Preferably, the ratios of the pitch circle diameter of the gears 30 to gear 28 and the gear 32 to gear 29 are 4:3.

Figure 6:
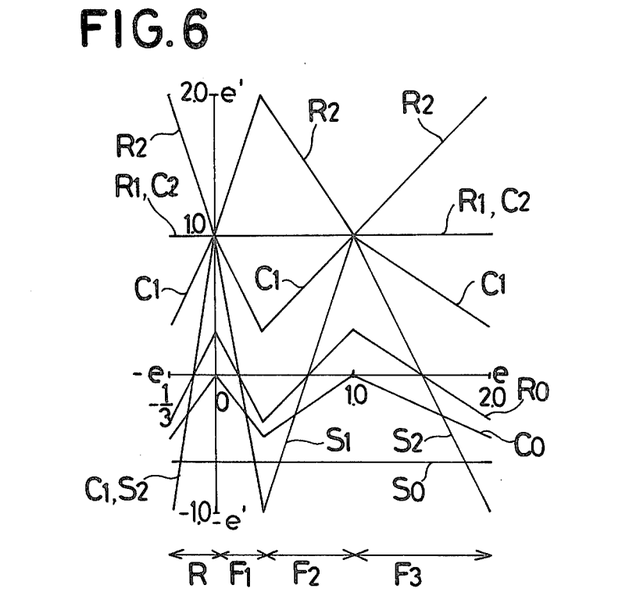
FIG. 6 is a graph illustrating the relationship between the rotational speed ratio e′ of planetary gear components (ring gears, sun gears, and carriers) to the input shaft and the input-output speed ratio e for the embodiment of the transmission, in accordance with this invention, shown in FIG. 5.
Figure 7:
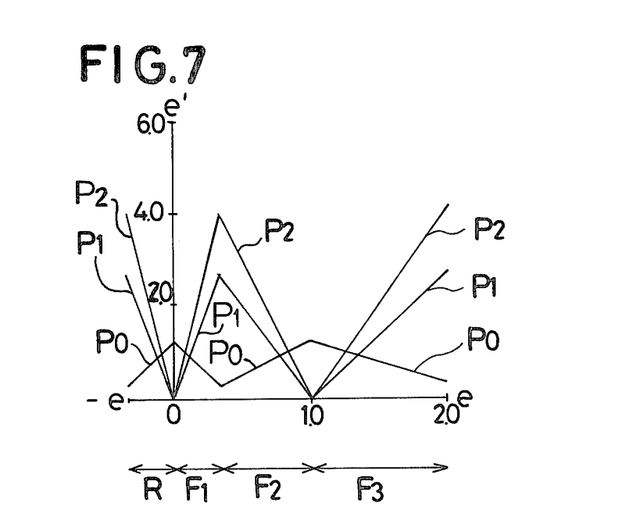
FIG. 7 is a graph illustrating the relationship between the rotational speed ratio e′ of planetary gear components (pinions) to the input shaft and the input-output speed ratio e for the embodiment of the transmission, in accordance with this invention, shown in FIG. 5.

Further reference is now made to FIGS. 2 and 6–7, to describe in detail the operation of the transmission as embodied and shown in FIG. 5.

To establish the first forward input-output speed ratio range F1 during operation of the transmission, the clutch CL1 is engaged. To establish the second forward input-output speed ratio range F2, the clutch CL3 is engaged while the clutch CL1 is disengaged. To establish the third forward input-output speed ratio range F3, the clutch CL4 is engaged while the clutch CL3 is disengaged. To establish the reverse input-output speed ratio range R, the clutch CL2 is engaged while the clutch CL1 is disengaged.

When the hydraulic capacity D1 of the first hydraulic pump motor 12 is continuously varied during each of the above-mentioned input-output speed ratio ranges F1, F2, F3 and R, the input-output speed ratio e is also continuously varied. The hydraulic capacity D1 of the first pump motor 12 in relationship to the speed ratio e during the different speed ranges is best illustrated in FIG. 2. The rotational speed ratios e' of the various components of the first and second differential gear mechanisms 20 and 25, respectively, to the input shaft 10 in relationship to the input-output speed ratio e are best illustrated in FIGS. 6 and 7. During the operation of this second preferred embodiment of the invention, the input-output speed ratio e can be continuously varied within the range of $-\frac{1}{3}$ to 2.0. Accordingly, the results achieved by the second embodiment of this invention are similar to that of the first embodiment of this invention.

Figure 8:
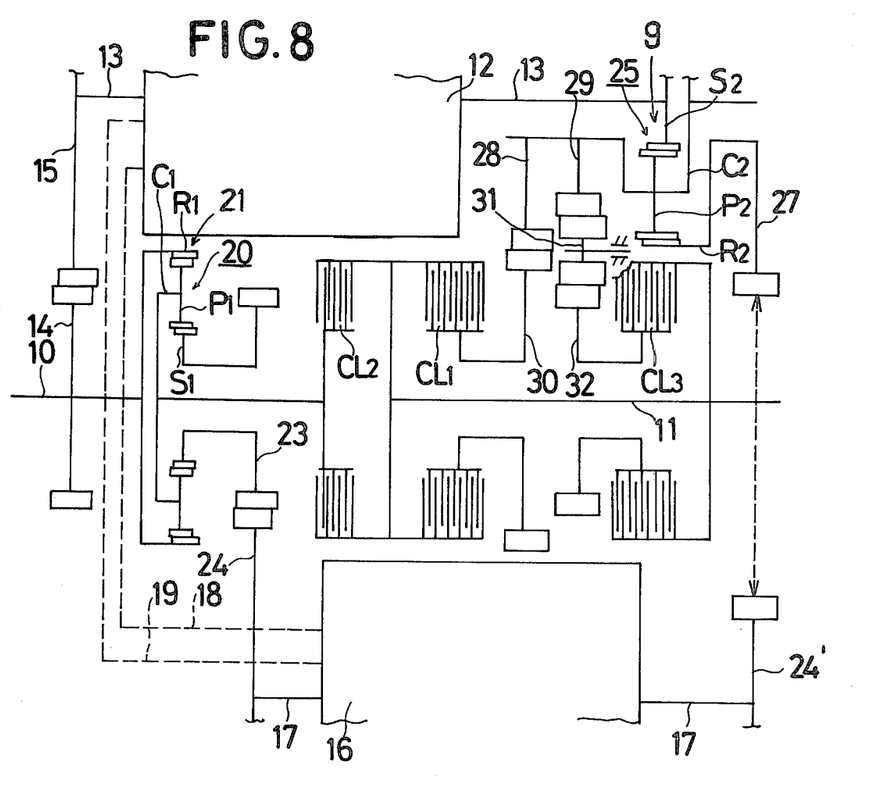
FIG. 8 is a schematic drawing of a third embodiment of the output split-type mechanical and hydraulic transmission employing the teachings of this invention.

Referring now to FIG. 8, there is shown a third preferred embodiment of an output split-type mechanical and hydraulic transmission employing the teachings of this invention. The same reference numerals are used to describe similar elements for this third embodiment as those described and shown in the first and second preferred embodiments of FIGS. 1 and 5, respectively. In accordance with the invention, the transmission includes an input shaft 10, and an output shaft 11. As herein embodied, the output shaft 11 is coaxially arranged with the input shaft 10.

In accordance with the invention, the transmission further comprises first and second hydraulic pump motors 12 and 16, respectively, which are hydraulically connected to each other. As herein embodied, the first and second pump motors 12 and 16 are hydraulically connected to each other by the conduits 18 and 19.

In accordance with the invention, at least the first pump motor 12 has a variable hydraulic capacity D1 and is mechanically connected to the input shaft 10. As herein embodied, the second pump motor 16 has a fixed hydraulic capacity D2. It is preferred that the first and second hydraulic pump motors 12 and 16 be axial piston-type pump motors wherein the hydraulic capacity D1 of the first pump motor 12 is variable from D1 MAX to −D1 MAX, D1 MAX being equivalent to −D1

MAX and to the hydraulic capacity D2 of the second pump motor 16.

As herein embodied and as shown in FIG. 8, the first and second hydraulic pump motors 12 and 16 have rotational shafts 13 and 17, respectively, parallel to the input shaft 10. Preferably, the rotational shaft 13 of the first pump motor 12 is mechanically connected to the input shaft 10 by a set of gears 15 and 14.

In accordance with the invention, the transmission further comprises a first differential gear mechanism 20. As herein embodied, the first differential gear mechanism 20 includes at least three elements, the first element being connected to the input shaft 10, the second element being connected to the output shaft 11, and the third element being connected to the second pump motor 16. Preferably, the first differential gear mechanism 20 is coaxially arranged with the input shaft 10 and the output shaft 11.

As herein embodied and as shown in FIG. 8, the first differential gear mechanism 20 comprises a first planetary gear unit 21. Preferably, the first planetary gear 21 includes a sun gear S1, a ring gear R1, a pinion P1 meshed with the sun gear S1 and the ring gear R1, and a carrier C1 rotatably supporting the pinion P1.

As herein embodied and as shown in FIG. 8, the ring gear R1 of the first planetary gear unit 21 is integrally connected to the input shaft 10 and comprises the first element of the first differential gear mechanism 20.

As herein embodied, the carrier C1 of the first planetary gear unit 21 is selectively connected to the output shaft 11 and comprises the second element of the first differential gear mechanism 20.

As herein embodied, the sun gear S1 of the first planetary gear unit 21 is mechanically connected to the second hydraulic pump motor 16 and comprises the third element of the first differential gear mechanism 20. Preferably, the sun gear S1 is mechanically connected to the rotational shaft 17 of the second hydraulic pump motor 16 by a set of gears 24 and 23 as shown in FIG. 8.

In accordance with the invention, the transmission further comprises clutch means for selectively cooperating with elements of the differential gear mechanisms to establish different input-output speed ratio ranges. As herein embodied and as shown in FIG. 8, this clutch means includes a clutch CL2 for selectively engaging and disengaging the carrier C1 (the second element) of the first differential gear mechanism 20 with the ouput shaft 11.

In accordance with the invention, the transmission further comprises a second differential gear mechanism 25. As herein embodied, the second differential gear mechanism 25 includes at least three elements, the first element being connected to the input shaft 10, the second element being connected to the output shaft 11, and the third element being connected to the second hydraulic pump motor 16. Preferably, the second differential gear mechanism 25 is coaxially arranged with the rotational shaft 13 of the first hydraulic pump motor 12.

As herein embodied, the second differential gear mechanism 25 comprises a second planetary gear unit 9. Preferably, the second planetary gear unit 9 includes a sun gear S2 mechanically connected to the input shaft 10, a ring gear R2 mechanically connected to the second pump motor 16, a pinion P2 meshed with the ring gear R2 and the sun gear S2, and a carrier C2 rotatably supporting the pinion P2 and selectively and mechanically connected to the output shaft 11.

As herein embodied and as shown in FIG. 8, the sun gear S2 of the second planetary gear unit 9 is integrally connected to the rotational shaft 13 of the first hydraulic pump motor 12 and comprises the first element of the second differential gear mechanism 25.

As herein embodied and as shown in FIG. 8, the carrier C2 of the second planetary gear unit 9 is mechanically and selectively connected to the output shaft 11 and comprises the second element of the second differential gear mechanism 25. It is preferred that the carrier C2 be mechanically connected to the output shaft 11 through either the set of gears 28 and 30 or the set of gears 29, 31, and 32 as shown in FIG. 8.

As herein embodied and as shown in FIG. 8, the ring gear R2 of the second planetary gear unit 9 is mechanically connected to the rotational shaft 17 of the second hydraulic pump motor 16 through a set of gears 27 and 24' and comprises the third element of the second differential gear mechanism 25.

As previously mentioned, in accordance with the invention, the transmission comprises clutch means for selectively cooperating with elements of the differential gear mechanisms to establish different input-output speed ratio ranges. In accordance with the invention, this clutch means includes clutch means for selectively connecting the second element of the second differential gear mechanism 25 to the output shaft 11. As herein embodied and as shown in FIG. 8, the clutch means for selectively connecting the second element of the second differential gear mechanism 25 to the output shaft 11 includes a clutch CL1 for selectively connecting and disconnecting the carrier C2 (the second element) of the second differential gear mechanism 25 with the output shaft 11. Preferably, the clutch CL1 selectively connects and disconnects the carrier C2 to the output shaft 11 through the gears 28 and 30. The gear 30 is integrally connected to the clutch CL1 and meshed with the gear 28 which is integrally connected to the carrier C2.

As herein embodied and as shown in FIG. 8, the clutch means for selectively connecting the second element of the second differential gear mechanism 25 to the output shaft 11 includes another clutch CL3 for selectively connecting and disconnecting the carrier C2 (the second element) of the second differential gear mechanism 25 with the output shaft 11. Preferably, the clutch CL3 selectively connects and disconnects the carrier C2 to the output shaft 11 through the gears 29, 31, and 32. Gear 32 is integrally connected to the clutch CL3 and meshed with gear 31, an idler gear, which in turn is meshed with the gear 29 integrally connected to the carrier C2.

It is preferred that the clutches CL1, CL2, and CL3 be of a frictional type which is hydraulically actuated.

In the third preferred embodiment of the transmission shown in FIG. 8, it is preferred that the ratios of the pitch circle diameter of the ring gear to sun gear of the first planetary gear 21 (R1/S1) be 2:1. It is further preferred that the ratio of the pitch circle diameter of the ring gear to sun gear of the second planetary gear 9 (R2/S2) be 3:1. Preferably, the ratios of the pitch circle diameter of the gear 15 to gear 14 and the gear 24 to gear 23 be 3:2, while the ratio of the pitch circle diameter of the gear 27 to gear 24' be 3:1. It is further preferred that the ratios of the pitch circle diameter of the gears 30 to gear 28 and the gear 32 to gear 29 be 1:1.

Figure 9:
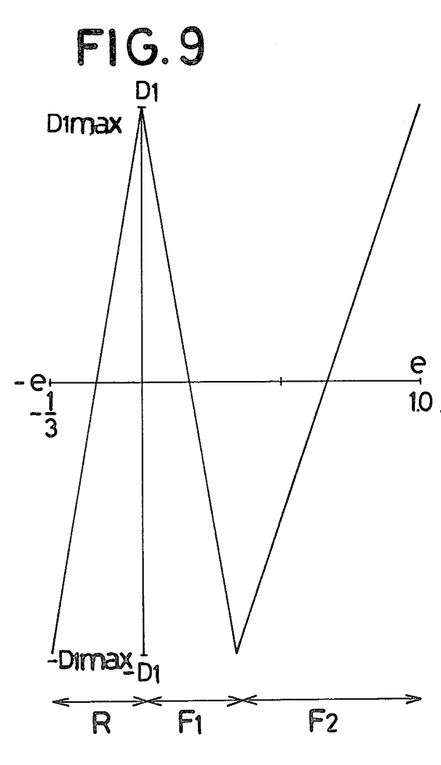
FIG. 9 is a graph illustrating the relationship between the hydraulic capacity D1 of the first hydraulic pump motor and an input-output speed ratio e for the embodiment of the transmission, in accordance with this invention, shown in FIG. 8.
Figure 10:
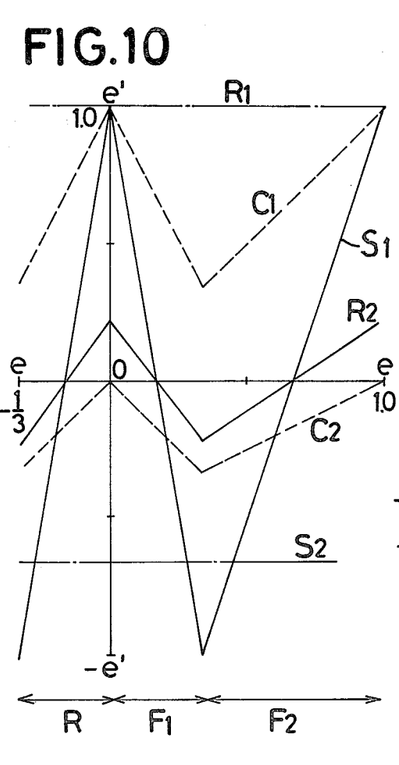
FIG. 10 is a graph illustrating the relationship between the rotational speed ratio e′ of planetary gear components (ring gears, sun gears, and carriers) to the input shaft and the input-output speed ratio e for the embodiment of the transmission, in accordance with this invention, shown in FIG. 8.
Figure 11:
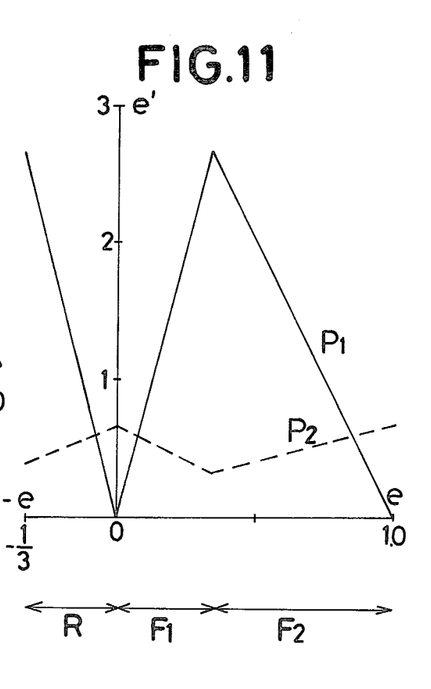
FIG. 11 is a graph illustrating the relationship between the rotational speed ratio e′ of planetary gear components (pinions) to the input shaft and the input-output speed ratio e for the embodiment of the transmission, in accordance with this invention, shown in FIG. 8.

Further reference is now made to FIGS. 9-11, to describe in detail the operation of the transmission as embodied and shown in FIG. 8.

To establish the first forward input-output speed ratio range F1 during operation of the transmission, the clutch CL1 is engaged. To establish the second forward input-output speed ratio range F2, the clutch CL2 is engaged while the clutch CL1 is disengaged. To establish the reverse input-output speed ratio range R, the clutch CL3 is engaged while the clutch CL1 is disengaged.

When the hydraulic capacity D1 of the first hydraulic pump motor 12 is continuously varied during each of the above-mentioned input-output speed ratio ranges F1, F2 and R, the input-output speed ratio e is also continuously varied. The hydraulic capacity D1 of the first pump motor 12 in relationship to the speed ratio e during the different speed ranges is best illustrated in FIG. 9. The rotational speed ratios e' of the various components of the first and second differential gear mechanisms 20 and 25, respectively, to the input shaft 10 in relationship to the input-output speed ratio e are best illustrated in FIGS. 10 and 11. During the operation of this third preferred embodiment of the invention, the input-output speed ratio e can be continuously varied within the range of $-\frac{1}{3}$ to 1.0.

It will be apparent to those skilled in the art that various modifications and variations could be made in the output split-type mechanical and hydraulic transmission without departing from the scope or spirit of the invention.

What is claimed is:

1. An output split-type mechanical and hydraulic transmission comprising:
   (a) an input shaft;
   (b) an output shaft;
   (c) first and second hydraulic pump motors hydraulically connected to each other, and at least said first pump motor having a variable hydraulic capacity and being drivingly connected to said input shaft;
   (d) a first differential gear mechanism including at least three elements and comprising a first planetary gear unit having,
      (1) a first sun gear forming the third element drivingly connected to said second pump motor;
      (2) a first carrier rotatably supporting a first pinion meshed with said first sun gear and forming the second element drivingly connected to said output shaft; and
      (3) a first ring gear meshed with said first pinion and forming the first element drivingly connected to said input shaft;
   (e) a second differential gear mechanism including at least three elements and comprising a second planetary gear unit having,
      (1) a second sun gear forming the first element drivingly connected to said input shaft;
      (2) a second carrier rotatably supporting a second pinion meshed with said second sun gear and forming the second element selectively connected to said output shaft; and
      (3) a second ring gear meshed with said second pinion and forming the third element drivingly connected to said second pump motor; and
   (f) a clutch means for selectively cooperating with said elements of said differential gear mechanisms to establish different input-output speed ratio ranges, said clutch means including first clutch means for selectively connecting said second element of said second differential gear mechanism to said output shaft to thereby selectively provide a first power train by means of said second differential gear mechanism.

2. The output split-type mechanical and hydraulic transmission as set forth in claim 1, wherein said clutch means includes second clutch means for selectively cooperating with said elements of said first differential gear mechanism to thereby selectively provide a second power train by means of said first differential gear mechanism.

3. The output split-type mechanical and hydraulic transmission as set forth in claim 2, wherein said second clutch means is selectively connecting said third element of said first differential gear mechanism to said second pump motor.

4. The output split-type mechanical and hydraulic transmission as set forth in claim 2, wherein said second clutch means is selectively connecting said second element of said first differential gear mechanism to said output shaft.

5. The output split-type mechanical and hydraulic transmission as set forth in claim 4, wherein said first ring gear is integrally connected to said input shaft and said first sun gear is mechanically connected to said second pump motor.

6. The output split-type mechanical and hydraulic transmission as set forth in claim 1, wherein said first differential gear mechanism further comprises a third planetary gear unit having,
   (1) a third sun gear drivingly connected to said second pump motor;
   (2) a third carrier rotatably supporting a third pinion meshed with said third sun gear and drivingly connected to said input shaft; and
   (3) a third ring gear meshed with said third pinion and drivingly connected to said output shaft.

7. The output split-type mechanical and hydraulic transmission as set forth in claim 6, wherein said first differential gear mechanism further comprises a fourth element for providing a third power train by means of said third planetary gear unit.

8. The output split-type mechanical and hydraulic transmission as set forth in claim 7, wherein said fourth element comprises said third sun gear selectively connected to said second hydraulic pump motor.

9. The output split-type mechanical and hydraulic transmission as set forth in claim 8, wherein said clutch means for selectively cooperating with said elements of said differential mechanisms includes a third clutch means for selectively connecting said third sun gear and said second hydraulic pump motor.

10. The output split-type mechanical and hydraulic transmission as set forth in claim 7, wherein said fourth element comprises said third ring gear selectively connected to said output shaft.

11. The output split-type mechanical and hydraulic transmission as set forth in claim 10, wherein said clutch means for selectively cooperating with said elements of said differential gear mechanisms includes a third clutch means for selectively connecting said third ring gear and said output shaft.

12. The output split-type mechanical and hydraulic transmission as set forth in claim 1, wherein said output shaft is coaxially arranged with said input shaft.

13. The output split-type mechanical and hydraulic transmission as set forth in claim 12, wherein said first differential gear mechanism is coaxially arranged with said input and output shafts.

14. An output split-type mechanical and hydraulic transmission, comprising:
(a) an input shaft;
(b) an output shaft;
(c) first and second hydraulic pump motors hydraulically connected to each other, and at least said first pump motor having a variable hydraulic capacity and being drivingly connected to said input shaft;
(d) a first differential gear mechanism including four elements and comprising a first planetary gear unit and a third planetary gear unit, each of said units having a sun gear, a ring gear, a carrier rotatably supporting a pinion meshed with said sun gear and said ring gear;
(e) a second differential gear mechanism including at least three elements and comprising said second planetary gear unit having a sun gear, a carrier rotatably supporting a pinion meshed with said sun gear, a ring gear, and wherein
(1) said first element comprises said sun gear of said second planetary gear unit mechanically connected to said input shaft;
(2) said second element comprises said carrier of said second planetary gear unit selectively connected to said output shaft; and
(3) said third element comprises said ring gear of said second planetary gear unit drivingly connected to said second pump motor; and
(f) a clutch means for selectively cooperating with said elements of said differential gear mechanism to establish different input-output speed ratio ranges, said clutch means including, first clutch means for selectively connecting said second element of said second differential gear mechanism to said output shaft to thereby selectively provide a first power train by means of said second differential gear mechanism.

15. The output split-type mechanical hydraulic transmission as in claim 14 wherein said first differential gear mechanism includes a first element comprising said ring gear of said first planetary gear unit and said carrier of said third planetary gear unit integrally connected to said input shaft; a second element comprising said carrier of said first planetary gear unit drivingly connected to said output shaft; a third element comprising said sun gear of said first planetary gear unit drivingly connected to said second pump motor; and a fourth element comprising said sun gear of said third planetary gear unit drivingly connected to said second pump motor.

16. The output split-type mechanical and hydraulic transmission as set forth in claim 15 wherein said clutch means includes a second clutch means selectively cooperating with the third element of said first differential gear mechanism for selectively providing a second power train by means of said first differential gear mechanism.

17. The output split-type hydraulic and mechanical transmission as set forth in claim 14 wherein said first differential gear mechanism includes a first element comprising said ring gear of said first planetary gear unit and said carrier of said third planetary gear unit integrally connected to said input shaft; a second element comprising said carrier of said first planetary gear unit and drivingly connected to said output shaft; a third element comprising said sun gear of said first planetary gear unit drivingly connected to said second pump motor; and a fourth element comprising said ring gear of said third planetary gear unit drivingly connected to said output shaft.

18. The output split-type hydraulic and mechanical transmission as set forth in claim 17 wherein said clutch means includes a second clutch means for selectively cooperating with said fourth element of said first differential gear mechanism to thereby selectively provide a second power train by means of said first differential gear mechanism.

19. The output split-type mechanical and hydraulic transmission as set forth in claim 14, further comprising an intermediate shaft integrally connected to said carrier of said second planetary gear unit and selectively connected to said output shaft and wherein said first clutch means selectively connects said intermediate shaft to said output shaft.

20. An output split-type mechanical and hydraulic transmission comprising:
(a) an input shaft;
(b) an output shaft;
(c) an intermediate shaft selectively and mechanically connected to said output shaft;
(d) first and second hydraulic pump motors hydraulically connected to each other, and at least said first pump motor having a variable hydraulic capacity and being mechanically connected to said input shaft;
(e) a first differential gear mechanism having first and third planetary gear units, each of said planetary gear units comprising a sun gear, a ring gear, a pinion meshed with said sun gear and said ring gear, and a carrier rotatably supporting said pinion, and wherein said sun gears of said first and third planetary gear units are integrally connected to each other and mechanically connected to said second hydraulic pump motor, said carrier of said third planetary gear unit is integrally connected to said input shaft and to said ring gear of said first planetary gear unit, and said ring gears of said first and third planetary gear units are selectively connected to said output shaft;
(f) a second differential gear mechanism having a second planetary gear unit with a sun gear, a ring gear, a pinion meshed with said ring gear and said sun gear thereof, and a carrier rotatably supporting said pinion, and wherein said sun gear of said second planetary gear unit is mechanically connected to said input shaft, said ring gear of said second planetary gear unit is mechanically connected to said second pump motor, and said carrier of said second planetary gear unit is integrally connected to said intermediate shaft;
(g) first clutch means for selectively connecting and disconnecting said intermediate shaft to said output shaft; and
(h) second clutch means for selectively connecting and disconnecting said carrier of said first planetary gear unit to said output shaft and said ring gear of said third planetary gear unit to said output shaft.

21. The output split-type mechanical and hydraulic transmission as set forth in claim 20, wherein the ratio of the pitch circle diameter of said ring gear to sun gear of said first, second, and third planetary gears is 2:1.

22. The output split-type mechanical and hydraulic transmission as set forth in claim 20, wherein said second hydraulic pump motor has a fixed hydraulic capacity.

23. The output split-type mechanical and hydraulic transmission as set forth in claim 20, wherein said first and second pump motors have rotational shafts parallel to said input shaft, said output shaft is coaxially arranged with said input shaft, said first differential gear mechanism is coaxially arranged with said input and output shafts, and said second differential gear mechanism and said intermediate shaft are coaxially arranged with said rotational shaft of said first pump motor.

24. The output split-type mechanical and hydraulic transmission as set forth in claim 23, further comprising a first set of gears for mechanically connecting said rotational shaft of said first pump motor to said input shaft and a second set of gears for mechanically connecting said rotational shaft of said second pump motor to said sun gears of said first and third planetary gear units and to said ring gear of said second planetary gear unit, and wherein said sun gear of said second planetary gear unit is integrally connected to said rotational shaft of said first pump motor.

25. The output split-type mechanical and hydraulic transmission as set forth in claim 24, further comprising third and fourth sets of gears for mechanically connecting said intermediate shaft to said output shaft, and wherein said first clutch means selectively connects said intermediate shaft to said output shaft through said third or fourth set of gears.

26. The output split-type mechanical and hydraulic transmission as set forth in claim 25, wherein the ratio of the pitch circle diameter of the gears of said first set of gears for connecting said rotational shaft of said second pump motor to said sun gears of said first differential gear mechanism is 3:2 and for connecting said rotational shaft of said second pump motor to said ring gear of said second differential gear mechanism is 2:1, wherein the ratio of the pitch circle diameter of the gears of said second set of gears for connecting said rotational shaft of said first pump motor to said input shaft is 3:2, and wherein the ratios of the pitch circle diameter of the gears of said third and fourth sets of gears for connecting said output shaft to said intermediate shaft are 3:4.

27. An output split-type mechanical and hydraulic transmission comprising:
(a) an input shaft;
(b) an output shaft;
(c) first and second hydraulic pump motors hydraulically connected to each other, and at least said first pump motor having a variable hydraulic capacity and being mechanically connected to said input shaft;
(d) a first differential gear mechanism having a first planetary gear unit comprising a first sun gear mechanically connected to said second pump motor, a first ring gear integrally connected to said input shaft, a first pinion meshed with said first sun and ring gears, and a first carrier rotatably supporting said first pinion and selectively connected to said output shaft;
(e) a second differential gear mechanism having a second planetary gear unit comprising a second sun gear mechanically connected to said input shaft, a second ring gear mechanically connected to said second pump motor, a second pinion meshed with said second sun and ring gears, and a second carrier rotatably supporting said second pinion and selectively connected to said output shaft;
(f) first clutch means for selectively connecting said disconnecting said second carrier to said output shaft; and
(g) second clutch means for selectively connecting and disconnecting said first carrier to said output shaft.

28. The output split-type mechanical and hydraulic transmission as set forth in claim 27, wherein the ratio of the pitch circle diameter of said first ring gear to said first sun gear is 2:1 and said second ring gear to said second sun gear is 3:1.

29. The output split-type mechanical and hydraulic transmission as set forth in claim 27, wherein said second hydraulic pump motor has a fixed hydraulic capacity.

30. The output split-type mechanical and hydraulic transmission as set forth in claim 27, wherein said first and second pump motors have rotational shafts parallel to said input shaft, said output shaft is coaxially arranged with said input shaft, said first differential gear mechanism is coaxially arranged with said input and output shafts, and said second differential gear mechanism is coaxially arranged with said rotational shaft of said first pump motor.

31. The output split-type mechanical and hydraulic transmission as set forth in claim 30, further comprising a first set of gears for mechanically connecting said rotational shaft of said first pump motor to said input shaft, a second set of gears for mechanically connecting said rotational shaft of said second pump motor to said first sun gear, and a third set of gears for mechanically connecting said rotational shaft of said second pump motor to said second ring gear, and wherein said second sun gear is integrally connected to said rotational shaft of said first pump motor.

32. The output split-type mechanical and hydraulic transmission as set forth in claim 21, further comprising fourth and fifth sets of gears for mechanically connecting said second carrier to said output shaft, and wherein said first clutch means selectively connects said second carrier to said output shaft through said fourth of fifth set of gears.

33. The output split-type mechanical and hydraulic transmission as set forth in claim 32, wherein the ratio of the pitch circle diameter of the gears of said first set of gears for connecting said rotational shaft of said first pump motor to said input shaft is 3:2, wherein the ratio of the pitch circle diameter of the gears of said second set of gears for connecting said rotational shaft of said second pump motor to said first sun gear is 3:2, wherein the ratio of the pitch circle diameter of the gears of said third set of gears for connecting said second ring gear to said rotational shaft of said second pump motor is 3:1, and wherein the ratios of the pitch circle diameter of the gears of said fourth and fifth sets of gears for connecting said output shaft to said second carrier are 1:1.

34. An output split-type mechanical and hydraulic transmission comprising:
(a) an input shaft;
(b) an output shaft;
(c) an intermediate shaft selectively and mechanically connected to said output shaft;
(d) first and second hydraulic pump motors hydraulically connected to each other, and at least said first pump motor having a variable hydraulic capacity and being mechanically connected to said input shaft;

(e) a first differential gear mechanism having first and third planetary gear units, each of said planetary gear units comprising a sun gear, a ring gear, a pinion meshed with said sun gear and said ring gear, and a carrier rotatably supporting said pinion, and wherein said sun gears of said first and third planetary gear units are selectively and mechanically connected to said second hydraulic pump motor, said carrier of said third planetary gear unit is integrally connected to said input shaft and to said ring gear of said first planetary gear unit, and said ring gear of said third planetary gear unit is integrally connected to said output shaft and to said carrier of said first planetary gear unit;

(f) a second differential gear mechanism having a second planetary gear unit with a sun gear, a ring gear, a pinion meshed with said ring gear and said sun gear thereof, and a carrier rotatably supporting said pinion, and wherein said sun gear of said second planetary gear unit is mechanically connected to said input shaft, said ring gear of said second planetary gear unit is mechanically connected to said second pump motor, and said carrier of said second planetary gear unit is integrally connected to said intermediate shaft;

(g) first clutch means for selectively connecting and disconnecting said intermediate shaft to said output shaft;

(h) second clutch means for selectively connecting and disconnecting said sun gear of said first planetary gear unit to said second hydraulic pump motor and said second gear of said third planetary gear unit to said second hydraulic pump motor.

35. The output split-type mechanical and hydraulic transmission as set forth in claim 34, wherein the ratio of the pitch circle diameter of said ring gear to sun gear of said first, second, and third planetary gears is 2:1.

36. The output split-type mechanical and hydraulic transmission as set forth in claim 34, wherein said second hydraulic pump motor has a fixed hydraulic capacity.

37. The output split-type mechanical and hydraulic transmission as set forth in claim 34, wherein said first and second pump motors have rotational shafts parallel to said input shaft, said output shaft is coaxially arranged with said input shaft, said first differential gear mechanism is coaxially arranged with said input and output shafts, and said second differential gear mechanism and said intermediate shaft are coaxially arranged with said rotational shaft of said first pump motor.

38. The output split-type mechanical and hydraulic transmission as set forth in claim 37, further comprising a first set of gears for mechanically connecting said rotational shaft of said first pump motor to said input shaft and a second set of gears for mechanically connecting said rotational shaft to said second pump motor to said sun gears of said first and third planetary gear units and to said ring gear of said second planetary gear unit, and wherein said sun gear of said second planetary gear unit is integrally connected to said rotational shaft of said first pump motor.

39. The output split-type mechanical and hydraulic transmission as set forth in claim 38, further comprising third and fourth sets of gears for mechanically connecting said intermediate shaft to said output shaft, and wherein said first clutch means selectively connects said intermediate shaft to said output shaft through said third or fourth set of gears.

40. The output split-type mechanical and hydraulic transmission as set forth in claim 39, wherein the ratio of the pitch circle diameter of the gears of said first set of gears for connecting said rotational shaft of said second pump motor to said sun gears of said first differential gear mechanism is 3:2 and for connecting said rotational shaft of said second pump motor to said ring gear of said second differential gear mechanism is 2:1, wherein the ratio of the pitch circle diameter of the gears of said second set of gears for connecting said rotational shaft of said first pump motor to said input shaft is 3:2, and wherein the ratios of the pitch circle diameter of the gears of said third and fourth sets of gears for connecting said output shaft to said intermediate shaft are 3:4.

* * * * *

UNITED STATES PATENT AND TRADEMARK OFFICE
CERTIFICATE OF CORRECTION

PATENT NO. : 4,184,385
DATED : January 22, 1980
INVENTOR(S) : Hiroaki Maeda

It is certified that error appears in the above-identified patent and that said Letters Patent are hereby corrected as shown below:

Column 20, Claim 32, line 38, change "21" to --31--.

line 42, change "of" to --or--.

Signed and Sealed this

*Fifteenth* Day of *April 1980*

[SEAL]

*Attest:*

SIDNEY A. DIAMOND

*Attesting Officer*     *Commissioner of Patents and Trademarks*